United States Patent [19]

Kim

[11] Patent Number: 5,407,878
[45] Date of Patent: Apr. 18, 1995

[54] METAL PASSIVATION/SOX CONTROL COMPOSITIONS FOR FCC

[75] Inventor: Gwan Kim, Olney, Md.

[73] Assignee: W. R. Grace & Co.-Conn., New York, N.Y.

[21] Appl. No.: 127,923

[22] Filed: Sep. 28, 1993

Related U.S. Application Data

[63] Continuation-in-part of Ser. No. 831,610, Feb. 5, 1992, Pat. No. 5,288,675, and a continuation-in-part of Ser. No. 959,023, Oct. 9, 1992, abandoned.

[51] Int. Cl.[6] .................. B01J 29/38; C01F 17/00
[52] U.S. Cl. ............................. 502/41; 502/65; 502/303; 502/521
[58] Field of Search .............. 502/65, 303, 341, 41, 502/521

[56] References Cited

U.S. PATENT DOCUMENTS

| | | | |
|---|---|---|---|
| 4,423,019 | 12/1983 | Bertolacini et al. | 423/244 |
| 4,428,827 | 1/1984 | Hobbs et al. | 208/120 |
| 4,447,552 | 5/1984 | Hayes et al. | 502/41 |
| 4,469,589 | 9/1984 | Yoo et al. | 208/120 |
| 4,471,070 | 9/1984 | Siefert et al. | 502/302 |
| 4,472,267 | 9/1984 | Yoo et al. | 208/120 |
| 4,495,304 | 1/1985 | Yoo et al. | 502/66 |
| 4,495,305 | 1/1985 | Yoo et al. | 502/65 |
| 4,497,902 | 2/1985 | Bertolacini et al. | 502/65 |
| 4,609,539 | 9/1986 | Horecky et al. | 423/244 |
| 4,622,210 | 11/1986 | Hirschberg et al. | 422/144 |
| 4,728,635 | 3/1988 | Bhattacharyya et al. | 502/304 |
| 4,735,705 | 4/1988 | Burk, Jr. et al. | 208/113 |
| 4,758,418 | 7/1988 | Yoo et al. | 423/244 |
| 4,790,982 | 12/1988 | Yoo et al. | 423/239 |
| 4,836,993 | 6/1989 | Bertolacini et al. | 423/244 |
| 4,963,520 | 10/1990 | Yoo et al. | 502/64 |
| 5,007,999 | 4/1991 | Chin | 502/41 |

*Primary Examiner*—Carl F. Dees
*Attorney, Agent, or Firm*—Steven Capella

[57] ABSTRACT

A composition comprising a coprecipitated magnesia-lanthana-alumina ($MgO$—$La_2O_3$—$Al_2O_3$) wherein the MgO component is present as microcrystalline phase, having a BET ($N_2$) surface area of at least 130 $m^2/g$, preferably part of which contains a catalytic oxidation and/or reducing promoter metal such as ceria, vanadia, iron and/or titania, is combined with an FCC catalyst which is used to catalytically crack a hydrocarbon feedstock that contains metal and/or sulfur.

10 Claims, 2 Drawing Sheets

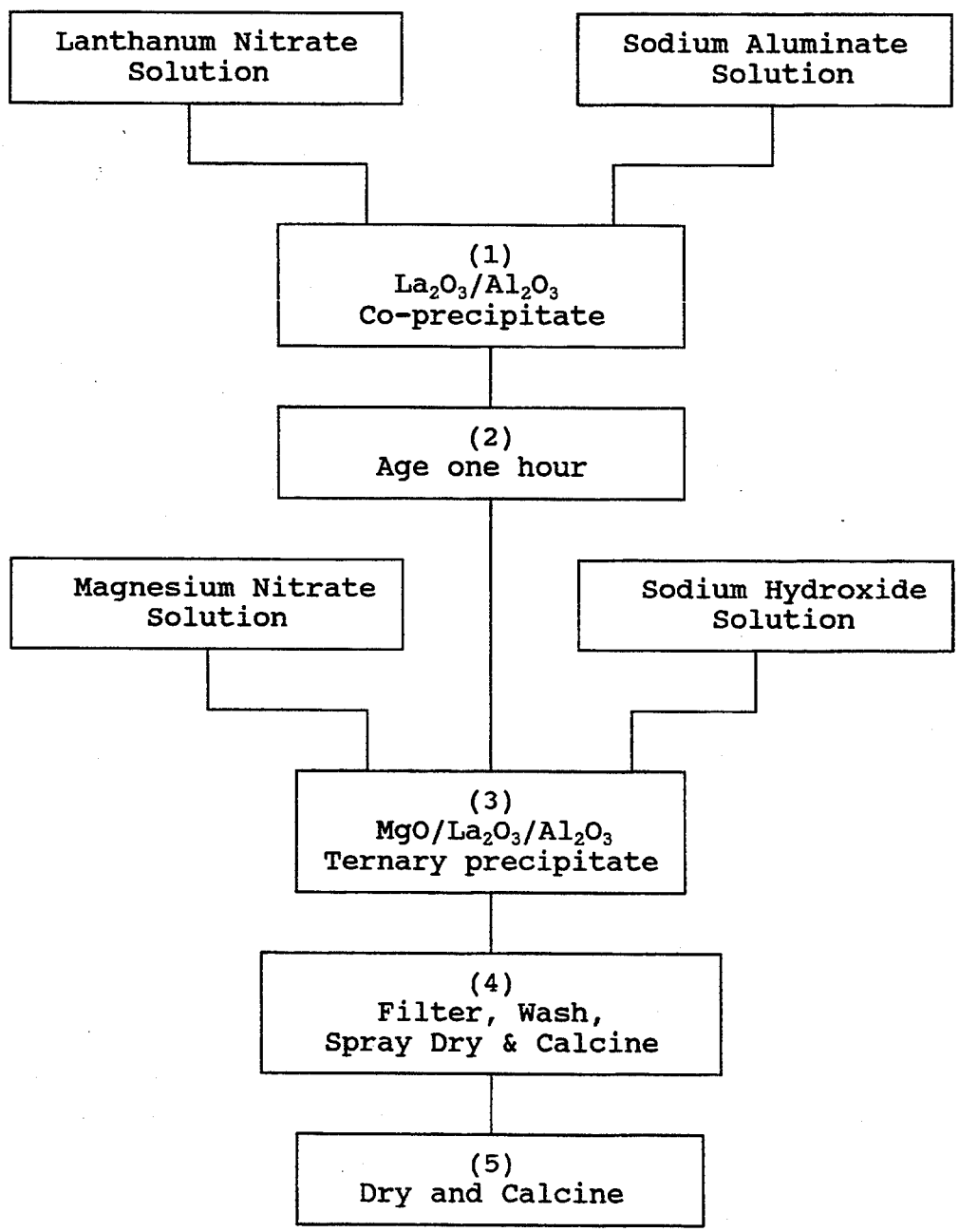
FIGURE I

FIGURE II
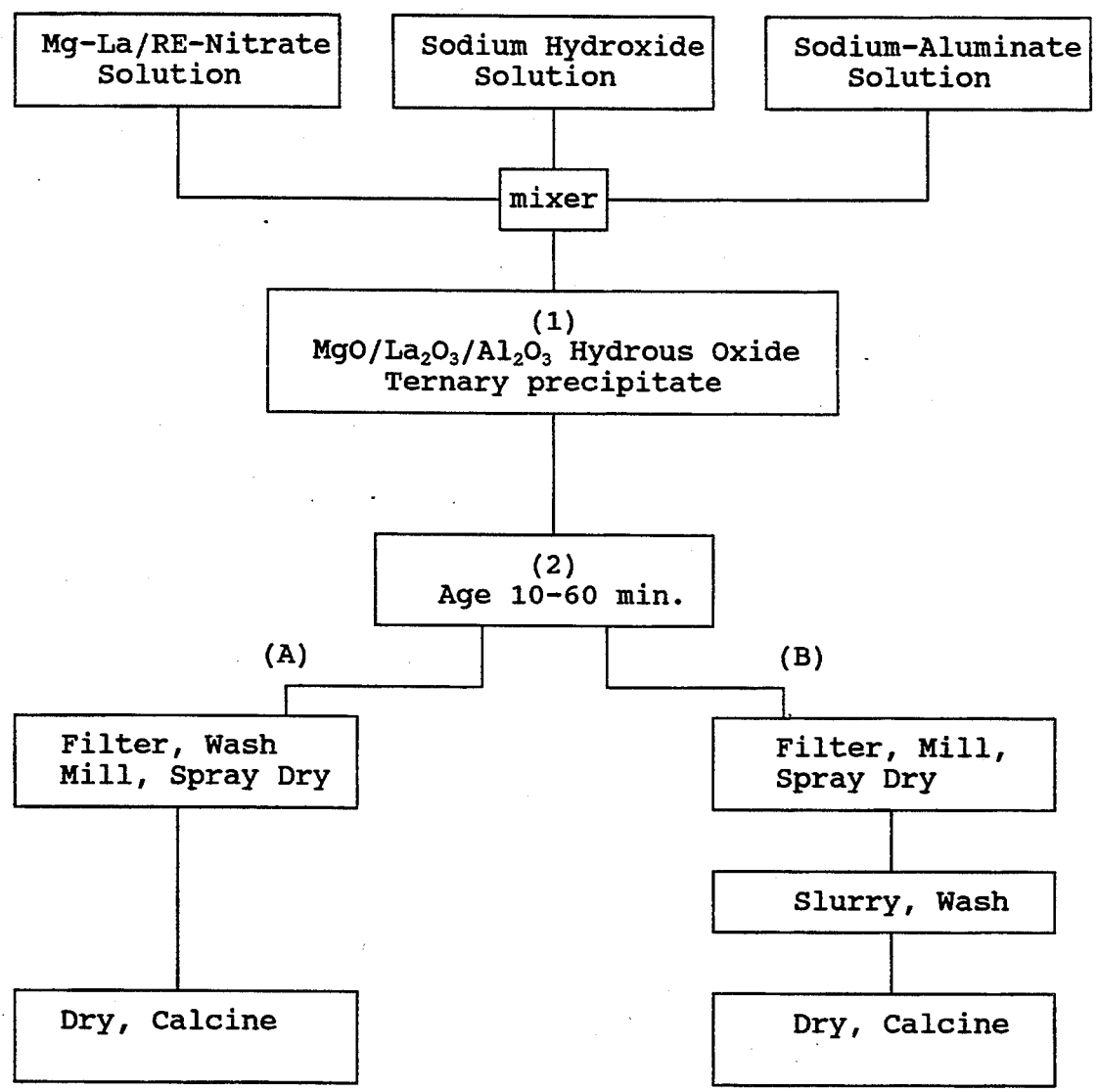

METAL PASSIVATION/SOX CONTROL COMPOSITIONS FOR FCC

This application is a continuation-in-part of my U.S. Ser. No. 831,610, filed Feb. 5, 1992, now U.S. Pat. No. 5,288,675, and 959,023 filed Oct. 9, 1992, and now abandoned.

The present invention relates to compositions which are used to control SOx emission and the adverse effects of metals such as V and/or Ni encountered in fluid catalytic cracking (FCC) operations, and more particularly to compositions that passivate Ni and/or V during the catalytic cracking of hydrocarbons as well as control SOx emissions during oxidation regeneration of the catalysts.

Compositions which have been used to passivate Ni and/or V as well as control SOx emissions typically comprise magnesia, alumina and rare earth oxides.

In particular, U.S. Pat. No. 4,472,267, U.S. Pat. No. 4,495,304 and U.S. Pat. No. 4,495,305 disclose compositions which contain magnesia-alumina spinel supports in combination with rare-earths such as ceria and lanthana, and U.S. Pat. No. 4,836,993 discloses the preparation of magnesium aluminate ($MgAl_2O_4$) and magnesia-alumina composites that are combined with a rare earth and used as sulfur oxide absorbent in FCC processes.

While prior compositions have been successfully used to control the adverse effects of V and/or Ni as well as the SOx emissions from FCC units, the industry requires compositions that are efficient for the passivation of V and/or Ni which is present in hydrocarbon feedstocks.

In addition, V and/or Ni/SOx control agents which are used in the form of separate particulate additives must have hardness and attrition properties that enable the additive to remain in a circulating FCC catalyst inventory.

SUMMARY OF THE INVENTION

It is, therefore, an object of the present invention to provide novel SOx gettering agent/metals passivation compositions.

It is another object to provide metal control additives for use in FCC processes that are also efficient for SOx pick-up and release as well as the passivation of V and/or Ni.

It is a further object to provide magnesia-lanthana-alumina containing metals/SOx control additives that are resistant to attrition and capable of maintaining sufficiently high surface area when used in the highly abrasive and hydrothermal conditions encountered in a commercial FCC process.

It is yet another object to provide efficient/economical methods for preparing metals/SOx control additives on a commercial scale.

These and still further objects will become readily apparent to one skilled-in-the-art from the following detailed description, specific examples, and drawings.

BRIEF DESCRIPTION OF THE DRAWINGS

FIGS. 1 and 2 are block diagrams which illustrate preferred methods for preparing the novel composition of the present invention.

DETAILED DESCRIPTION OF THE INVENTION

Broadly, my invention contemplates a novel nonspinel, ternary oxide base having the formula (expressed in weight percent calculated as the oxides):

30 to 50 MgO/5 to 30 $La_2O_3$/30 to 50 $Al_2O_3$ wherein the MgO component is present as a microcrystalline phase which is particularly effective for passivating V and/or Ni as well as controlling SOx emissions during the catalytic cracking of hydrocarbons.

More specifically, my invention comprises a novel $MgO/La_2O_3/Al_2O_3$ ternary oxide base which is preferably combined with catalytic oxidation and/or reducing promoters such as oxides of Ce, V, Fe and/or Ti in combination with zeolite containing catalytic cracking compositions which are used to process hydrocarbon feedstocks that contain Ni/V and/or sulfur.

The preferred additive compositions are further characterized by: A fresh surface area of 100 to 300 $m^2/g$ following 2-hour air calcination at 538° C., and preferably 130 to 260 $m^2/g$ as determined by the B.E.T. method using nitrogen; a surface area of 100 to 200 $m^2/g$ upon 48-hour steaming with 20% steam/80% air; a pore volume of 0.4 to 1.0 cc/g as determined by water; a nitrogen pore volume of at least about 0.3 cc/g, preferably 0.4 to 0.6 cc/g from nitrogen porosimetry covering up to 600 Å pore diameter at 0.967 relative pressure; an attrition resistance of 0 to 45 Davison Index (DI) as determined by the method disclosed in U.S. Pat. Nos. 3,650,988 and 4,247,420 for fresh material after 2-hour air calcination at 538° C.; a microcrystalline MgO component before and after steaming as determined by X-ray diffraction; when used as an SOx control additive, the composition preferably includes a total promoter metal content of 1 to 15 weight percent as oxides, and preferably 2 to 10% by weight ceria and/or vanadia; a sodium content of less than about 1% by weight $Na_2O$, and preferably less than 0.5% by weight $Na_2O$; and a bimodal distribution of mesopores in the 40–200 Å and 200–2000 Å regions. The median (pore volume basis) pore diameter from nitrogen porosimetry ranges from approximately 50 Å to 100 Å, depending on the final calcination condition, e.g., simple air calcination at 538° C. or air calcination at 704° C. with varying levels of steam.

Referring to FIG. 1, it is seen that the composition may be prepared by a multi-step process described as follows:

(1) A solution containing a lanthanum salt such as lanthanum nitrate is reacted with a solution of sodium aluminate under conditions wherein a separate stream of lanthanum nitrate is combined with a stream of sodium aluminate solution over a period of 20 to 60 minutes in a stirred reaction vessel to form a lanthanum-aluminum hydrous oxide coprecipitate.

(2) The coprecipitated lanthanum-aluminum hydrous oxide slurry mixture of step (1) is aged at a pH of 9.3 to 9.7 for a period of 0.1 to 2 hours at a temperature of 20° to 65° C.

(3) The aged slurry of step (2) is then reacted with an aqueous solution of magnesium nitrate and a solution of sodium hydroxide which are added as separate streams over a period of 20 to 60 minutes to a stirred reaction vessel at a pH of about 9.5 and at a temperature of 20° to 65° C. to obtain a ternary magnesium/lanthanum/aluminum hydrous oxide precipitate.

(4) The ternary oxide precipitate of step (3) is separated by filtration, washed with water to remove extraneous salts, preferably spray dried, and calcined at a temperature of 450° to 732° C. to obtain a ternary oxide base composition that is free of $MgAl_2O_4$ spinel and having a surface area of 130 to 260 $m^2/g$.

(5) The ternary oxide base obtained in step (4), when used as an SOx additive, is preferably impregnated with solutions of cerium and/or vanadium, iron and optionally titanium to impart a ceria content of about 5 to 15 weight percent and a vanadia and iron content of about 1 to 10 weight percent and optionally a titania content of 0 to 10 weight percent.

(6) The impregnated base of step (5) is then dried and calcined at a temperature of 450° to 700° C.

Alternative methods for preparing the novel compositions are outlined in FIG. 2 wherein: the magnesium/lanthanum/rare earth nitrate, sodium hydroxide, sodium aluminate solutions described above are combined in a mixer (typically a four-port mix-pump) to form a Mg—La/RE—Al ternary hydrous oxide coprecipitate which is aged for about 10 to 60 minutes and then further processed into particulate SOx control additives as shown in alternative processing methods (A) and (B).

The preferred compositions of the present invention are prepared in the form of microspheres which have a particle size range of 20 to 200 microns and a Davison attrition index (DI) of 0 to 45, preferably 0 to 15, and are suitable for use as SOx control additive in FCC processes.

The metals control additive composition may be combined with conventional commercially available FCC catalyst zeolite-containing FCC catalysts which typically contain 10 to 60 weight percent zeolite such as Type Y, ultrastable Y, ZSM-5 and/or Beta zeolite dispersed in an inorganic oxide matrix, such as the Octacat ®, XP ®, Super-D ®, and DA ® grades produced and sold by W. R. Grace & Co.-Conn.

It is contemplated that the metals control SOx control additive compositions may also be incorporated in FCC catalyst particles during manufacture in a catalyst preparation procedure such as disclosed in U.S. Pat. No. 3,957,689, U.S. Pat. No. 4,499,197, U.S. Pat. No. 4,542,118 and U.S. Pat. No. 4,458,623 and Canadian 967,136.

The metals control additive compositions (unpromoted) are typically added to a FCC catalyst in amounts ranging from 0.2 to 15 weight percent and more preferably 0.5 to 5 weight percent. In addition, the catalyst composition may include about 1 to 15 weight percent of the ceria/vanadia promoted compositions for control of SOx emissions. The promoted/unpromoted compositions may be pre-blended prior to adding to a FCC unit. In one preferred embodiment, the FCC catalyst will also contain a noble metal combustion/oxidation catalyst such as Pt and/or Pd in amounts of 0.1 to 10 ppm. The FCC catalyst/SOx control composition mixture is reacted with hydrocarbon gas-oil and residual feedstocks that contain as much as 2.5 weight percent sulfur (S), 0.005 weight percent Ni and/or 0.005 weight percent V, at temperatures of 520° to 1100° C. (cracking reaction) and 700° to 750° C. (regeneration). In typical commercial FCC operations it is anticipated that the FCC catalyst may accomodate up to about one weight percent Ni and/or V and still contain an acceptable level of activity and/or selectivity.

Cracking activity is determined by the so-called microactivity test (MAT) method according to ASTM #D 3907-8.

The Davison Index (DI) is determined as follows:

A sample of catalyst is analyzed to determine the weight of particles in the 0 to 20 and 20+ micron size ranges. The sample is then subjected to a 1 hour test in a fluid catalyst attrition apparatus using a hardened steel jet cup having a precision bored orifice. An air flow of 21 liters a minute is used. The Davison Index is calculated as follows:

$$\text{Davison Index} = \frac{\text{wt. \% 0-20 micron material formed during test}}{\text{wt. original 20 + micron fraction}}$$

Having described the basic aspects of my invention, the following examples are included to illustrate specific embodiments.

EXAMPLE 1

A coprecipitation run was carried out by feeding one acidic stream and one basic stream simultaneously into a high speed mix-pump reactor with multiports, allowing the viscous product stream to fall into 4000 g of heel water in a kettle maintained at 38°–40° C. with good agitation. The acidic feedstream contained 654.4 g of MgO and 413.3 g of La-rich rare earth oxide, all in the form of nitrate in a total volume of 9840 ml. The basic feedstream had a sodium aluminate solution bearing 654.4 g of $Al_2O_3$ along with 320 g of 50 weight percent sodium hydroxide solution in a total volume of 9840 ml. While these two streams were fed at an equal rate of 400 ml/minute, the feed rate of stream No. 3 with 16 weight percent sodium hydroxide solution was adjusted so as to control pH of the slurry in the kettle at 9.4–9.5. After aging the slurry under this condition for 15 minutes and confirming pH was at 9.5 at the end of aging, the slurry was immediately vacuum filtered. The filtercake was then homogenized using a high-shear mixer, Drais milled once, rehomogenized, and was spray dried.

A 400 g portion of the above resulting microspheres was slurried once in 1000 g of tap water at room temperature for 3 minutes, and then was washed once with another 1000 g of room-temperature tap water, and filtered. After overnight drying in a 115° C. oven, the material was air calcined at 704° C. for 2 hours. Properties of the resulting material, hereafter to be referred to as 1A, are as follows: Chemical composition (weight percent): 36.8% MgO, 20.8% $La_2O_4$, 0.1% $CeO_2$, 23.4% total rare earth oxide, 0.2% $Na_2O$, and 39.1% $Al_2O_3$. The results from X-ray powder diffraction scan showed that this material was virtually $MgAl_2O_4$ spinel-free before and after 5-hour exposure to flowing (1.5 liters/minute) air containing 20 volume % steam at 788° C. Average particle size: 99 microns, attrition resistance: 17 DI (Davison Index), BET ($N_2$) surface area: 181 $m^2/g$.

A set of four 60-gram samples was prepared by physically blending an ORION ® family of Grace Davison FCC catalyst with 0, 5, 10, and 15 weight percent (on a dry basis) of 1A. Each sample was then treated according to the following protocol: Heated to 204° C. and allowed one-hour soak at this temperature in a muffle furnace; Raised at a rate of approximately 4° C./minute to 677° C. and then allowed to soak at this temperature for 3 hours; Cooled to room temperature; Impregnated with vanadium naphthenate in pentane to completely and uniformly cover all particles with vanadium; Allowed pentane to evaporate away in a muffle furnace at room temperature; Heated to 204° C. and held for one hour; Charged into an Inconel fluidbed reactor; Steamed for 5 hours in this fluidized bed at 788° C., with 80 vol. % steam (6.8 g $H_2O$/hour) and 20% vol. % air. Each sample was then examined for chemical and physical properties, especially the zeolite surface area. The results are presented in Table I. The data reveal unequivocally that the material 1A is highly effective in protecting zeolites in the FCC catalyst from vanadium attack. With only 5 weight percent of 1A in the blend, the zeolites in this blend retained approximately 93% more zeolite area than without 1A. With 10 weight percent of 1A, there is a 122% increase in zeolite area as a result of preferential vanadium capture by the material of this invention, 1A.

EXAMPLE 2

Another additive having a composition slightly different from 1A of Example 1 was prepared in exactly the same manner as in Example 1, except for the feedstream composition. The acidic feedstream consisted of 9840 ml of solution containing 671.6 g of MgO, 275.5 g of La-rich rare earth oxide, and 123.1 g of $CeO_2$, all in the form of nitrate. The basic feedstream contained 671.6 g of $Al_2O_3$ in the form of sodium aluminate solution along with 320 g of 50 weight percent sodium hydroxide solution in a total volume of 9840 ml.

The material obtained from spray drying, slurrying, washing, drying, and 2-hour air calcination at 704° C., hereafter to be referred to as 2A, had the following properties: Chemical composition (weight percent): 38.0% MgO, 13.8% $La_2O_3$, 5.7% $CeO_2$, 21.1% total rare earth oxide, 0.4% $Na_2O$, 0.3% $SO_4$, and 39.8% $Al_2O_3$. This material, 2A, also showed virtually no $MgAl_2O_4$ spinel before and after 5-hour steaming (80% steam/20% air) described in Example 1.

In exactly the same manner as in Example 1, another set of four 60-gram samples, ORION/2A blend, was prepared, and was treated with the same vanadium impregnation and steaming as described in Example 1. The results on this set of blends are presented in Table II. The data essentially confirm what has already been observed in Example 1.

EXAMPLE 3

A 71.82 g (70.00 g on a dry basis) portion of 2A of Example 2 was sprayed with fine mist of ammoniacal vanadium tartrate solution bearing 1.80 g of $V_2O_5$ to incipient wetness using an atomizer and a rotary mixer. After allowing the impregnated material to stand at room temperature for approximately 30 minutes, the material was oven dried overnight at 115° C., and then was air calcined at 538° C. for one hour. The resulting material, hereafter to be referred to as 3A, was virtually $MgAl_2O_4$ spinel-free according to X-ray powder diffraction scan before and after 48-hour exposure to flowing air (1.5 liters/minute) containing 20 vol. % steam at 702° C. The properties of this material are as follows: Chemical composition (weight percent): 35.9% MgO, 13.5% $La_2O_3$, 5.6% $CeO_2$, 20.8% total rare earth oxide, 0.4% $Na_2O$, 2.7% $V_2O_5$, and 39.4% $Al_2O_3$. Average particle size: 54 microns, Attrition resistance: 8 DI. BET ($N_2$) surface areas before and after 48-hour steaming (20% steam/80% air) were 181 and 124 $m^2$/g, respectively.

The above resulting material, 3A, was evaluated on the bench as a potential SOx additive, i.e., SOx transfer catalyst, capturing $SO_3$ in the oxidizing environment of the regenerator and releasing sulfur in the form of $H_2S$ in the reducing environment of the riser. Since the performance of SOx additive can be assessed largely by the capacity of $SO_3$ capture and the release capability in the form of $H_2S$, the following two tests were carried out for this sample:

(1) Capacity for $SO_3$ capture: A blend was prepared from 9.950 g of steamed (6 hours in a fluidized bed at 760° C. and 5 psig) OCTACAT® (another Grace Davison FCC catalyst) and 0.050 g of fresh 3A, all on a dry basis. It was charged into an Inconel reactor having an I.D. of 1.04 cm, and was subjected to two-stage treatments: First, a 30-minute reduction in flowing (1.5 liters total/min.) $N_2$ containing 2 vol. % $H_2$, and next, a 30-minute oxidation in flowing (1.5 liters total/min. $N_2$ containing 4 vol. % $O_2$ and 0.0900 vol. % $SO_2$ at 732° C. After each treatment, the sample was discharged, homogenized, and the sulfate level was determined on a one-gram portion removed from the sample. The weight percent $SO_4$ found in this sample as a result of the oxidation treatment was 0.46%. This was taken as a measure of the capacity for $SO_3$ capture. The capacity found for this sample represents approximately 85% of the theoretical maximum—the maximum weight percent $SO_4$ that can be accumulated in this sample is approximately 0.54% when all metals but aluminum form stoichiometric sulfates at 732° C. The material of this invention, 3A, thus has a quite high capacity for $SO_3$ storage.

(2) Release capability: A 0.40 g sample of fresh 3A was placed in a down-flow Vycor glass reactor, and was exposed to flowing $N_2$ containing 9.50 vol. % $O_2$ and 0.6000 vol % $SO_2$ at a total flow rate of 126 ml/minute and 732° C. for a period of 3 hours, and cooled in flowing $N_2$ for discharge. A 0.10 g portion of the above-treated sample was examined by temperature-programmed reduction (TPR)/massspectrometer in a ramp-mode at a rate of 20° C./min., using propane at 14.2 ml/min. as a reducing agent. During the course of this TPR run, the concentration of $H_2S$ was determined as a function of temperature by monitoring mass number 34. The TPR scan data plot, $H_2S$ counts vs. temperature for this sample showed an onset temperature—the temperature here represents a sort of dynamic temperature rather than equilibrium or steady/isothermal temperature—of approximately 500° C., which is well below the riser bottom temperature. Thus, 3A is expected to show a release capability.

EXAMPLE 4

Three of the four steamed samples with vanadium listed in Table I for Example 1 were evaluated by microactivity test (MAT) using a fixed bed reactor described in ASTM Method No. D3907. The feedstock employed in MAT evaluation was a sour, imported heavy gas oil with properties shown in Table III. The MAT data at constant conversion summarized in Table IV clearly demonstrate what one can expect from the materials of this invention. Namely, there is activity benefit, as reflected in the substantially decreased catalyst-to-oil weight ratio (C/O) for the FCC catalyst samples blended with some of the materials of this invention. There are also selectivity benefits—especially noticeable are the drastically lowered coke and $H_2$ gas yields and substantially increased gasoline yield.

EXAMPLE 5

An additive with a composition very slightly different from 2A was prepared in exactly the same manner as in Example 2 by making minor changes in Mg/rare earth/Al ratio for the feedstreams. The material obtained from spray drying, followed by slurrying, washing, drying, and 2-hour calcination at 538° C., hereafter to be referred to as 5A, had the following properties: Chemical composition (weight percent): 39.1% MgO, 12.0% $La_2O_3$, 7.4% $CeO_2$, 20.7% total rare earth oxide, 0.1% $Na_2O$, 0.3% $SO_4$, and 39.6% $Al_2O_3$. Some of the physical properties are—0.67 g/cc average bulk density, 73 micron average particle size, 187 $m^2$/BET ($N_2$) surface area, 0.485 $N_2$ pore volume, 66 Å median ($N_2$-PV) pore diameter, and 10 DI.

A set of three 60-gram samples of ORION®/5A blend was prepared, and was steamed with vanadium in exactly the same manner as in Example 1. Properties and MAT data at constant conversion for these samples are presented in Tables V and VI, respectively. These data essentially confirm the kind of results we have already shown in Tables I and IV for the materials of this invention.

EXAMPLE 6

A co-precipitation run was carried out by simultaneously feeding two feedstreams, one acidic, the other basic, into a high speed mix-pump reactor with multiports, allowing the viscous outlet stream to fall into 4000 g of heel water in a kettle which was maintained at 38°–39°0 C. with good agitation. The acidic feedstream contained 688.8 g of MgO, 223.9 g of La-rich rare earth oxide, and 120.6 g of $CeO_2$, all in the form of nitrate in a total volume of 9840 ml. The basic feedstream had a sodium aluminate solution bearing 688.8 g of $Al_2O_3$ along with 448 g of 50 weight percent sodium hydroxide solution in a total volume of 9840 ml. While these two feedstreams were pumped into the mix-pump reactor at an equal rate of 400 ml/minute, the resulting slurry in the kettle was maintained at 9.5 pH and 38°–39° C., feeding a 16 weight percent sodium hydroxide solution directly into the kettle throughout the run. After allowing the slurry to age under this condition for 15 minutes, pH of the slurry was raised to 9.6 using 16 weight percent sodium hydroxide solution, and then the slurry was immediately dewatered. The filtercake was homogenized, Drais milled once, rehomogenized, and then was spray dried.

A portion of the above resulting microspheres weighing 450 g was slurried once in 1125 g of tap water at room temperature for 3 minutes, dewatered, washed once with another 1125 g of room-temperature tap water, and then was dewatered. After overnight drying in a 115° C. oven, the material was air calcined at 704° C. for 2 hours. The resulting material, hereafter to be referred to as 6A, had the following properties: Chemical composition (weight percent): 39.02% MgO, 12.01% $La_2O_3$, 1.17% $Nd_2O_3$, 6.70% $CeO_2$, 19.97% total $RE_2O_3$, 0.23% $Na_2O$, 0.04% $Fe_2O_3$, 0.19% $SO_4$, and 40.05% $Al_2O_3$.

An 80.51 g (80.00 g on a dry basis) portion of 6A was sprayed with fine mist of ammonium-vanadium citrate solution bearing 2.05 g of $V_2O_5$ to incipient wetness using an atomizer and a rotary mixer. After allowing the impregnated material to stand at room temperature for approximately 30 minutes, the material was oven dried overnight at 115° C., and then was air calcined at 538° C. for one hour. The resulting catalyst, hereafter to be referred to as 6B, was virtually $MgAl_2O_4$ spinel-free according to X-ray powder diffraction scan before and after steaming—a 48-hour exposure to flowing air (1.5 liters/minute) containing 20 vol. % steam at 704° C. This catalyst has also been characterized by the following properties: Chemical composition (weight percent): 37.96% MgO, 11.68% $La_2O_3$, 1.17% $Nd_2O_3$, 6.52% $CeO_2$, 19.43% total $RE_3O_3$, 0.22% $Na_2O$, 0.04% $Fe_2O_3$, 0.18% $SO_4$, 38.96% $Al_2O_3$ and 2.72% $V_2O_5$. Physical properties: 0.62 g/cc average bulk density, 88 micron average particle size, 16 DI, 155 $m^2$/g surface area, 0.42 cc/g nitrogen pore volume, and 85 Å median pore diameter ($N_2$-PV basis).

EXAMPLE 7

A catalyst virtually identical to 6B in Example 6 was prepared in exactly the same manner as in Example 6 using the same formulation and procedure. A sample of blend consisting of 0.5 weight percent of this catalyst and 99.5 weight percent of ORION®-842 (one of the GRACE-Davison's family of FCC catalysts) equilibrium catalyst was prepared. This blend was pilot tested for 24 hours in a Davison Circulating Riser unit for assessing SOx removal efficiency using a gas oil containing 1.49 weight percent sulfur.

A 60 g portion of the above-tested sample was subjected to a so-called sink/float separation in order to separate the heavier particles (the non-FCC catalyst fraction that has picked up most of $SO_3$) from the lighter ones (the FCC catalyst particles which picked up very little $SO_3$) as follows: (1) First, by mixing with high-density (2.96 g/cc at room temperature) organic liquid medium (e.g., tetrabromoethane) to allow the entire particles to float, (2) next, by adding an appropriate amount of relatively low-density organic liquid medium (e.g. tetrachloroethane) that is miscible with the higher-density medium so that the relatively heavier particles will sink while the rest will remain floating or suspended, and (3) finally, by centrifuging, e.g., at 2000 RPM, followed by decantation. A sufficient quantity of sink fraction was obtained by repeating this separation procedure. The prominent phases present in the sink fraction identified by X-ray powder diffraction scan were $\beta$-$MgSO_4$ and transitional aluminas. This demonstrates the chemical consequence of magnesia component of the material of this invention when subjected to real FCC conditions.

EXAMPLE 8

Another co-precipitation run was carried out in exactly the same manner as in Example 6, using a slightly different feed-stream this time to include vanadium in the run-off. The acidic feedstream had 688.8 g of MgO, 223.9 g of La-rich rare earth oxide, and 120.5 g of $CeO_2$, all in the form of nitrate in a total volume of 9840 ml. Included also in this acidic feedstream was 46.0 g of $V_2O_5$ in the form of ammonium-vanadium citrate. The basic feedstream consisted of a sodium aluminate solution containing 688.8 g of $Al_2O_3$ along with 384 g of 50 weight percent sodium hydroxide solution in a total volume of 9840 ml. A 1000 g portion of washed filtercake was oven-dried overnight at 115° C. The resulting cake was crushed and sifted to have 100–325 mesh particles. The catalyst obtained by one-hour air calcination at 450° C., hereafter to be referred to as 8A, had the following properties: Chemical composition (weight percent): 38.12% MgO, 11.14% $La_2O_3$, 1.29% $Nd_2O_3$, 6.73% $CeO_2$, 19.64% total $RE_2O_3$, 0.12% $Na_2O$, 0.01% $Fe_2O_3$, 0.13% $SO_4$ 39.18% $Al_2O_3$, and 2.63% $V_2O_5$. This catalyst was found to be $MgAl_2O_4$ spinel-free before and after 48-hour steaming (20% steam/80% air) at 704° C. according to the results of powder X-ray diffraction scan. BET ($N_2$) surface areas before and after the steaming are 223 and 133 m²/g respectively.

EXAMPLE 9

In exactly the same manner as in Example 8, this co-precipitation run was carried out to include iron in the run-off. The acidic feedstream contained 688.8 g of MgO, 195.9 g of La-rich rare earth oxide, 103.7 g of $CeO_2$, and 39.6 g of $Fe_2O_3$, all in the form of nitrate in a total volume of 9840 ml. The basic feedstream contained a sodium aluminate solution bearing 688.8 g of $Al_2O_3$ along with 576 g of 50 weight percent sodium hydroxide solution in a total volume of 9840 ml. After spray drying and washing in the same manner as in Example 6, the material was dried for 30 minutes in a 204° C. preheated oven, and then was air calcined in a preheated furnace at 732° C. for 30 minutes. The resulting catalyst, hereafter to be referred to as 9A, had the following properties: Chemical composition (weight percent): 39.73% MgO, 10.29% $La_2O_3$, 1.04% $Nd_2O_3$, 5.82% $CeO_2$, 17.21% total $RE_2O_3$, 0.46% $Na_2O$. 2.25% $Fe_2O_3$, 0.11% $SO_4$, and 39.91% $Al_2O_3$. Physical properties: 0.57 g/cc average bulk density, 91 micron average particle size, 32 DI, 156 m²/g surface area, 0.57 cc/g nitrogen pore volume, and 91 Å median pore diameter ($N_2$-PV basis). Powder X-ray diffraction scan showed that this material was $MgAl_2O_4$ spinel-free.

A 70.40 g (70.00 g on a dry basis) portion of 9A was sprayed with 57.70 g of ferric oxalate solution bearing 1.46 g of $Fe_2O_3$, using an atomizer and a rotary mixer. After allowing the impregnated material to stand at room temperature for 30 minutes, the material was dried once again in a 204° C. preheated oven, and then was air calcined in a 538° C. preheated furnace for 30 min. The resulting catalyst, hereafter to be referred to as 9B, had the following properties: Chemical composition (weight percent): 38.32% MgO, 10.39% $La_2O_3$, 1.06% $Nd_2O_3$, 5.74% $CeO_2$, 17.25% total $RE_2O_3$, 0.47% $Na_2O$, 4.29% $Fe_2O_3$, 0.22% $SO_4$, and 39.10% $Al_2O_3$. Physical properties: 0.62 g/cc average bulk density, 91 micron average particle size, 21 DI, 177 m²/g surface area, 0.576 cc/g nitrogen pore volume, and 80 Å median pore diameter ($N_2$-PV basis). Powder X-ray diffraction pattern of 9B was also $MgAl_2O_4$ spinel-free.

Another portion of 9A weighing 80.33 g (80.00 g on a dry basis) was sprayed to incipient wetness with 58.40 g ammonium-vanadium citrate solution bearing 2.05 g of $V_2O_5$. After allowing the impregnated material to stand at room temperature for 30 minutes, the material was dried in a 204° C. preheated oven, and then was air calcined in a 538° C. preheated furnace for 30 minutes. The resulting catalyst, hereafter to be referred to as 9C, showed the following properties: Chemical composition (weight percent): 38.73% MgO, 10.14% $La_2O_3$, 1.03% $Nd_2O_3$, 5.73% $CeO_2$, 16.95% total $RE_2O_3$, 0.47% $Na_2O$, 2.19% $Fe_2O_3$, 0.12% $SO_4$, and 38.61% $Al_2O_3$. Physical properties: 0.56 g/cc average bulk density, 86 micron average particle size, 29 DI, 161 m²/g surface area, 0.554 cc/g nitrogen pore volume, and 111 Å median pore diameter ($N_2$-PV basis). X-ray powder diffraction scan revealed that this material also was $MgAl_2O_4$ spinel-free.

EXAMPLE 10

Substituting chlorides for all nitrates, otherwise in exactly the same manner as in Example 6, a co-precipitation run was carried out to obtain a material having the same chemical composition as 6A, except in rare earth distribution. In order to wash chloride out of the spray dried particles, the following wash scheme was employed: 225 g of the spray dried material was slurried in 600 g of room-temperature tap water for 5 minutes; dewatered. It was then reslurried in 450 ml of 75° C., 3 weight percent ammonium carbonate solution for 10 minutes; dewatered. After twice washing with 450 ml of 75° C., 3 weight percent ammonium carbonate solution and dewatering; and three times rinsing with 450 ml of 75° C. tap-water and dewatering, the material was subjected to 45-minute drying in a preheated oven at 204° C., followed by 45-minute calcination in a preheated furnace at 704° C.

An 81.22 g (80.00 g on a dry basis) portion of the above-calcined material was sprayed with 49.71 g of ammonium-vanadium citrate solution bearing 2.05 g of $V_2O_5$. After allowing the material to stand at room temperature for 30 minutes, it was air calcined for 45 minutes in a 538° C. preheated furnace. The resulting catalyst, hereafter to be referred to as 10A, had the following properties: Chemical composition (weight percent ): 37.88% MgO, 8.88% $La_2O_3$, 2.71% $Nd_2O_3$, 6.45% $CeO_2$, 19.18% total $RE_2O_3$, 0.22% $Na_2O$, 0.06% $Fe_2O_3$, 0.27% $SO_4$, 38.55% $Al_2O_3$, and 2.67% $V_2O_5$. Physical properties: 0.66 g/cc average bulk density, 69 micron average particle size 12 DI, 150 m²/g surface area, 0.438 cc/g nitrogen pore volume, and 100 Å median pore diameter ($N_2$-PV basis). X-ray powder diffraction scan revealed the absence of $MgAl_2O_4$ spinel in 10A.

EXAMPLE 11

Another co-precipitation run was carried out in exactly the same manner as in Example 8, substituting chlorides for all nitrates as follows: The acidic feedstream had 688.8 g of MgO, 198.0 g of La-rich rare earth oxide, 108.5 g of $CeO_2$, and 37.9 g of $Fe_2O_3$, all in the form of chloride in a total volume of 9840 ml. The basic feedstream contained a sodium aluminate solution bearing 688.8 g of $Al_2O_5$ along with 672 g of 50% NaOH solution in a total volume of 9840 ml. The spray dried material was washed, dried, and calcined in exactly the same manner as in Example 10.

A portion of the above-calcined material weighing 81.01 g (80.00 g on a dry basis) was sprayed with 45.85 g of ammonium-vanadium citrate solution bearing 2.05 g of $V_2O_5$. After allowing the material to stand at room temperature for 30 minutes, the material was air calcined at 538° C. for 45 minutes in a preheated furnace. The resulting catalyst, hereafter to be referred to as 11A, had the following properties: Chemical composition (weight percent): 38.88% MgO, 7.49% $La_2O_3$, 2.42% $Nd_2O_3$, 6.05% $CeO_2$, 17.01% total $RE_2O_5$, 0.17% $Na_2O$, 2.14% $Fe_2O_3$, 0.25% $SO_4$, 38.19% $Al_2O_3$, and 2.62% $V_2O_5$. Physical properties: 0.67 g/cc average bulk density, 73 micron average particle size, 12 DI, 150 m²/g surface area, 0.436 cc/g nitrogen pore volume, and 97 Å median pore diameter ($N_2$-PV basis). Powder X-ray diffraction scan showed that 11A was spinel-free.

EXAMPLE 12

Materials prepared in Examples 6 and 8-11 were evaluated for their capability to oxidize $SO_2$ and to store $SO_3$ as well as for their $H_2S$ release capability as follows: First, each of the fresh samples was subjected to $SO_2$ plus air, and then was exposed to flowing propane as the sample temperature was linearly increased. The concentration of $H_2S$ given off was detected by a mass-spectrometer as a function of temperature. For example, a 0.40 g sample of fresh 6A was placed in a down-flow Vycor glass reactor, and was exposed to flowing $N_2$ containing 9.50 vol. % $O_2$ and 0.6000 vol. % $SO_2$ at a total flow rate of 126 ml/minute and 732° C. for a period of 3 hours, and cooled in flowing $N_2$ for discharge. A 0.10 g portion of thus treated sample was examined by temperature-programmed reduction (TPR) reaction/mass-spectrometer in a ramp-mode at a rate of 23° C./minute, using propane at 14.2 ml/minute as a reducing agent. The concentration of $H_2S$ (weight % $H_2S$ with respect to sample weight) released was determined as a function of temperature by monitoring mass number 34. Results taken from four sets of TPR scan data plots, $H_2S$ counts vs. temperature for different samples are summarized in Table VII. Typically, the $H_2S$ counts vs. temperature plot shows a peak in the vicinity of 680° C. Therefore, the cumulative amount (area under the peak expressed as weight % $H_2S$ relative to sample weight) of $H_2S$ released up to this temperature and two lower levels of temperatures was taken as a measure of the release capability. Well-promoted samples generally show low onset temperatures for the $H_2S$ release as well as sharp increase in the rate of subsequent release. The release virtually ends at approximately 800° C. Hence, the cumulative $H_2S$ released up to 800° C. was taken as a measure of the extent of $SO_2$ oxidation achieved over 3-hour period. The data reveal the following: (1) Results from sample Set 2 show that iron is not as good a promoter as vanadium at the same atom % loading; (2) Results from Sample Set 3 show that the best promotion can be achieved when the Ce-promoted base is further promoted with both Fe and V; (3) Data from Sample Set 4 reveal that the process of making the material of this invention is not limited to using nitrates as the source of nagnesium, rare earth, and iron.

EXAMPLE 13

A batch of spray-dried material identical to Example 10 in formulation as well as in coprecipitation method was prepared in exactly the same manner as in Example 10. A 450 g portion of the spray dried particles was slurried in 1125 g of room-temperature tap water for 3 minutes; and dewatered. It was reslurried in 1125 g of 80° C. water for 10 minutes, maintaining pH of the slurry at 8.5 using ammonium hydroxide. Finally, rinsed three times with 1125 g of 80° C. water and dewatered. After 30-minute drying in a 204° C. preheated oven, the material was subjected to 3-hour calcination in flowing air at 593° C. The resulting material, hereafter to be referred to as 13A, had the following properties: Chemical composition (weight percent): 39.54% MgO, 9.07% $La_2O_3$, 2.70% $Nd_2O_2$, 6.79% $CeO_2$, 19.69% total $RE_2O_3$, 0.20 $Na_2O$, 0.21% $Fe_2O_3$, 0.23% $SO_4$, and 39.92% $Al_2O_3$. Physical properties: 160 $m^2/g$ surface area, 0.545 cc/g nitrogen pore volume, and 120 Å median pore diameter ($N_2$-PV basis).

EXAMPLE 14

Another batch of spray-dried material identical to Example 11 in formulation as well as in coprecipitation method was prepared in exactly the same manner as in Example 11. A 450 g portion of the spray-dried particles was washed, dried, and calcined in the same manner as in Example 11. The resulting material, hereafter to be referred to as 14A, had the following properties: Chemical composition (weight percent): 39.56% MgO, 8.06% $La_2O_3$, 2.61% $Nd_2O_3$, 6.05% $CeO_2$, 17.84% total $RE_2O_3$, 0.17% $Na_2O$, 1.96% $Fe_2O_3$, 0.21% $SO_4$, and 39.98% $Al_2O_3$. Physical properties: 0.66 g/cc average bulk density, 86 micron average particle size, 21 DI, 156 $m^2/g$ surface area, 0.484 cc/g nitrogen pore volume, and 105 Å median pore diameter ($N_2$-PV basis).

EXAMPLE 15

For the purpose of demonstrating the efficiency of the above-prepared materials, 13A and 14A, for trapping vanadium in FCC operation, the following study was carried out: a 60-gram sample was prepared by physically blending an ORION® family of Grace-Davison FCC catalyst with 10 weight percent (on a dry basis) of 13A. In the same manner, another sample was prepared using 14A. The third sample containing no additive, i.e., unblended FCC catalyst, served as the base case. Each sample was then treated according to the following protocol: Heated to 204° C. and allowed one-hour soak at this temperature in a muffle furnace; raised at a rate of approximately 4° C. per minute to 677° C. and then allowed to soak at this temperature for 3 hours; cooled to room temperature; impregnated with vanadium naphthenate in pentane to completely and uniformly cover all particles with vanadium; allowed pentane to evaporate away in a muffle furnace at room temperature; heated to 204° C. and held for one hour; charged into an Inconel fluid-bed reactor; steamed for 5 hours in this fluidized bed at 788° C., with 80 vol % steam (6.8 g $H_2O$/hour) and 20 vol % air. Each sample was then examined for chemical and physical properties, especially the zeolite surface area. The results are presented in Table VIII. Each sample was also evaluated by microactivity test (MAT) using a fixed bed reactor according to ASTM Method No. D3907. The feedstock employed in MAT evaluation is shown in Table IX. The MAT results summarized in Table X clearly demonstrate that the material of this invention, with or without iron included in the composition, is an efficient vanadium trap.

TABLE I

| Effect of Additive 1A on FCC Catalyst | | | | |
|---|---|---|---|---|
| Blend (Wt.) Ratio 1A/FCC Cat. | 0/100 | 5/95 | 10/90 | 15/85 |
| Chemical Composition (wt. %) after steaming with vanadium | | | | |
| $Al_2O_3$ | 32.63 | 33.02 | 33.35 | 33.44 |
| $Na_2O$ | 0.43 | 0.42 | 0.42 | 0.39 |
| $SO_4$ | 0.51 | 1.11 | 1.27 | 1.07 |
| MgO | 0.08 | 2.38 | 3.98 | 6.00 |
| $RE_2O_3$ | 1.51 | 2.79 | 3.76 | 5.02 |
| Ni | 0.003 | 0.002 | 0.003 | 0.002 |
| V | 0.522 | 0.568 | 0.550 | 0.560 |
| Properties after steaming with vanadium | | | | |
| Unit Cell, Å | 24.23 | 24.23 | 24.24 | 24.23 |
| Pk. Ht. | 12 | 19 | 25 | 24 |
| Total S.A., $m^2/g$ | 68 | 114 | 127 | 129 |
| Zoolite B.A., $m^2/g$ | 45 | 83 | 90 | 89 |

TABLE II

Effect of Additive 2A on FCC Catalyst

| Blend (Wt.) Ratio 2A/FCC Cat. | 0/100 | 5/95 | 10/90 | 15/85 |
|---|---|---|---|---|
| Chemical Composition (wt. %) after steaming with vanadium | | | | |
| $Al_2O_3$ | 32.52 | 32.82 | 32.67 | 34.26 |
| $Na_2O$ | 0.44 | 0.43 | 0.42 | 0.43 |
| $SO_4$ | 0.49 | 1.08 | 1.07 | 1.01 |
| MgO | 0.08 | 2.30 | 4.18 | 5.77 |
| $RE_2O_3$ | 1.51 | 2.60 | 3.57 | 4.53 |
| Ni | 0.002 | 0.003 | 0.003 | 0.003 |
| V | 0.495 | 0.548 | 0.542 | 0.537 |
| Properties after steaming with vanadium | | | | |
| Unit cell, Å | 24.23 | 24.24 | 24.26 | 24.24 |
| Pk. Ht. | 19 | 30 | 34 | 36 |
| Total S.A., $m^2/g$ | 81 | 127 | 143 | 149 |
| Zoolite B.A., $m^2/g$ | 53 | 87 | 99 | 102 |

TABLE III

Properties of Sour, Imported, Heavy Gas Oil (SIHGO)

| | |
|---|---|
| API gravity at 16° C. | 22.5 |
| Sulfur (wt. %) | 2.6 |
| Nitrogen (wt. %) | 0.086 |
| Conradson Carbon (wt. %) | 0.25 |
| Aniline Point (°C.) | 73 |
| K Factor | 11.6 |
| D-1160 (° C.) | |
| IBP | 217 |
| 5 | 307 |
| 10 | 324 |
| 20 | 343 |
| 40 | 382 |
| 60 | 423 |
| 80 | 472 |
| 90 | 500 |
| 95 | 524 |

TABLE IV

Interpolated, Mass-Balanced MAT Yields at 55 wt. % Conversion
Samples: 5h/788° C. Steamed (80% steam/20% air at 0 psig)
1A/ORION ® Blends with 5000 ppm V
Test Conditions: 527° C., 30 sec. Contact Time, SIHGO Feed

| Blend wt. Ratio 1A/FCC Cat. | 0/100 | 5/95 | 10/90 |
|---|---|---|---|
| Cat./Oil Weight Ratio | 5.5 | 3.5 | 3.1 |
| MAT Yields @ 55% Conversion | | | |
| $H_2$ | 0.95 | 0.52 | 0.36 |
| $C_1 + C_2$'s | 2.3 | 1.8 | 1.6 |
| $C_3=$ | 2.8 | 3.0 | 3.1 |
| Total $C_3$'s | 3.4 | 3.5 | 3.6 |
| $C_4=$ | 3.8 | 4.0 | 4.1 |
| iso $C_4$ | 1.2 | 1.6 | 1.8 |
| Total $C_4$'s | 5.5 | 6.1 | 6.4 |
| $C_5^+$ Gasoline | 36.1 | 38.6 | 39.4 |
| LCO | 26.6 | 26.4 | 26.0 |
| 640 + Bottoms | 18.4 | 18.6 | 19.0 |
| Coke | 6.7 | 4.4 | 3.5 |
| GC-RON | 92.6 | 91.6 | 91.0 |
| GC-MON | 81.3 | 80.5 | 80.3 |
| n-Paraffins | 4.5 | 4.7 | 4.5 |
| iso-Paraffins | 24.1 | 26.7 | 28.5 |
| Olefins | 26.5 | 25.5 | 25.3 |
| Aromatics | 36.2 | 33.8 | 31.9 |
| Napthenes | 8.5 | 9.4 | 9.9 |

TABLE V

Effect of Additive 5A on PCC Catalyst

| Blend (Wt.) Ratio 5A/FCC Cat. | 0/100 | 5/95 | 10/90 |
|---|---|---|---|
| Chemical Composition (wt. %) after steaming with vanadium | | | |
| $Al_2O_3$ | 32.28 | 32.86 | 33.26 |
| $Na_2O$ | 0.43 | 0.42 | 0.39 |
| $SO_4$ | 0.50 | 1.07 | 1.08 |
| MgO | 0.11 | 2.25 | 4.31 |
| $RE_2O_3$ | 1.53 | 2.60 | 3.66 |
| Ni | 0.002 | 0.003 | 0.002 |
| V | 0.511 | 0.525 | 0.537 |
| Properties after steaming with vanadium | | | |
| Unit Cell, Å | 24.23 | 24.24 | 24.25 |
| Pk. Ht. | 21 | 32 | 35 |
| Total S.A., $m^2/g$ | 91 | 124 | 138 |
| Zeolite S.A., $m^2/g$ | 62 | 88 | 96 |

TABLE VI

Interpolated, Mass-Balanced MAT Yields at 60 wt. % Conversion
Samples: 5h/788°C. Steamed (80% steam/20% air at 0 psig)
5A/FCC Catalyst Blends with 5000 ppm V
Test Conditions: 527°C., 30 sec. Contact Time, SIHGO Feed

| Blend wt. Ratio 5A/FCC Cat. | 0/100 | 5/95 | 10/90 |
|---|---|---|---|
| Cat./Oil Weight Ratio | 5.4 | 4.3 | 3.6 |
| $H_2$ | 0.98 | 0.73 | 0.46 |
| $C_1 + C_2$'s | 2.4 | 2.1 | 1.9 |
| $C_3=$ | 3.2 | 3.3 | 3.4 |
| Total $C_3$'s | 3.8 | 4.0 | 4.1 |
| $C_4=$ | 4.2 | 4.3 | 4.4 |
| iso $C_4$ | 1.5 | 1.8 | 2.1 |
| Total $C_4$'s | 6.2 | 6.6 | 7.0 |
| $C_5^+$ Gasoline | 39.6 | 40.8 | 41.6 |
| LCO | 25.1 | 24.7 | 24.5 |
| 640 + Bottoms | 14.9 | 15.3 | 15.5 |
| Coke | 7.1 | 5.8 | 4.8 |
| GC-RON | 92.1 | 91.4 | 90.9 |
| GC-MON | 81.2 | 80.9 | 80.6 |
| n-Paraffins | 4.6 | 4.9 | 4.5 |
| i-Paraffins | 27.5 | 29.5 | 31.1 |
| Olefins | 22.5 | 21.6 | 21.2 |
| Aromatics | 37.7 | 36.2 | 34.5 |
| Napthenes | 7.7 | 8.3 | 9.0 |

TABLE VII $H_2S$ Released from $SO_3$-Saturated Samples in Ramp-mode TPR using Propane

| Sample No. | Set | Release Onset Temp. (°C.) | Amt. of $H_2S$ Released[a] vs. Temp. (°C.) | | | |
|---|---|---|---|---|---|---|
| | | | 630 | 655 | 680 | 800 |
| 6B | 1 | 490 | 1.4 | 2.7 | 5.3 | 10.3 |
| 6A | 2 | 625 | 0.0 | 0.3 | 1.2 | 10.1 |
| 8A | 2 | 490 | 2.0 | 4.0 | 7.1 | 12.3 |
| 9A | 2 | 560 | 1.2 | 2.3 | 4.2 | 11.2 |
| 9A | 3 | 560 | 1.1 | 2.2 | 3.9 | 11.2 |
| 9B | 3 | 560 | 1.1 | 2.5 | 4.8 | 11.3 |
| 9C | 3 | 475 | 2.3 | 4.6 | 7.4 | 11.8 |
| 10A | 4 | 490 | 1.9 | 3.9 | 6.6 | 10.6 |
| 10A | 4 | 450 | 2.2 | 4.4 | 7.3 | 11.9 |

[a]Cumulative amount (weight %) of $H_2S$ released up to the temperature indicated with respect to the weight of sample tested.

TABLE VIII

Properties of 10% Additive/90% FCC Catalyst Blends After Steaming with Vanadium

| Additive | None | 13A | 14A |
|---|---|---|---|
| Chemical Composition (wt. %) | | | |
| $Al_2O_3$ | 32.20 | 33.14 | 32.96 |
| $Na_2O$ | 0.44 | 0.41 | 0.41 |
| $SO_4$ | 0.49 | 1.06 | 1.05 |
| MgO | 0.08 | 4.39 | 4.30 |
| $Fe_2O_3$ | 0.55 | 0.52 | 0.70 |
| $RE_2O_3$ | 1.49 | 3.47 | 3.25 |
| Ni | 0.003 | 0.003 | 0.003 |
| V | 0.561 | 0.571 | 0.561 |
| Properties | | | |
| Unit Cell, Å | 24.22 | 24.24 | 24.25 |
| Pk. Ht. | 20 | 40 | 40 |
| Total S.A., $m^2/g$ | 84 | 148 | 147 |

TABLE VIII-continued

Properties of 10% Additive/90% FCC Catalyst Blends After Steaming with Vanadium

| Additive | None | 13A | 14A |
|---|---|---|---|
| Zoolite S.A., m²/g | 59 | 107 | 106 |

TABLE IX

Properties of Gas Oil Feed/Employed in MAT Evaluation

| | |
|---|---|
| API gravity at 16° C. | 21.4 |
| Sulfur (wt. %) | 0.3 |
| Total Nitrogen (wt. %) | 0.14 |
| Basic Nitrogen (wt. %) | 0.029 |
| Conradson Carbon (wt. %) | 4.8 |
| Aniline Point (°C.) | 97 |
| K-Factor | 11.9 |
| D-2887 Simulated Distillation (Vol. %, °C. at 1 atm) | |
| IBP | 269 |
| 5 | 337 |
| 10 | 368 |
| 20 | 399 |
| 40 | 454 |
| 60 | 509 |
| 80 | 583 |
| 90 | 637 |
| 95 | 680 |

TABLE X

Interpolated, Mass-Balanced MAT Yields at 65 wt. % Conversion
Samples: 5h/788° C. steamed (80% steam/20% air at 0 psig)
10% Additive/90% FCC Catalyst Blends with 0.56% V
Test Conditions: 527° C., 30 sec. contact time, Feed (TABLE III)

| Additive | None | 13A | 14A |
|---|---|---|---|
| Cat./Oil Weight Ratio | 4.5 | 2.5 | 2.5 |
| MAT Yields at 65% Conversion | | | |
| $H_2$ | 0.75 | 0.36 | 0.42 |
| $C_1 + C_2$ | 2.3 | 1.9 | 1.8 |
| $C_3=$ | 3.1 | 3.3 | 3.3 |
| Total $C_3$ | 3.9 | 4.0 | 4.0 |
| $C_4$ | 4.4 | 4.2 | 4.3 |
| $iC_4$ | 1.5 | 2.1 | 2.0 |
| Total $C_4$ | 6.5 | 6.8 | 6.8 |
| $C_5^+$ Gasoline | 43.2 | 46.4 | 46.3 |
| LCO | 19.4 | 19.1 | 19.2 |
| 640 + Bottoms | 15.6 | 15.9 | 15.8 |
| Coke | 8.2 | 5.4 | 5.6 |
| GC-RON | 89.9 | 88.4 | 88.6 |
| GC-MON | 79.4 | 78.6 | 78.7 |
| n-Paraffins | 5.3 | 5.6 | 5.6 |
| i-Paraffins | 28.8 | 32.2 | 31.7 |
| Olefins | 24.3 | 22.9 | 23.3 |
| Aromatics | 31.7 | 28.5 | 28.5 |

TABLE X-continued

Interpolated, Mass-Balanced MAT Yields at 65 wt. % Conversion
Samples: 5h/788° C. steamed (80% steam/20% air at 0 psig)
10% Additive/90% FCC Catalyst Blends with 0.56% V
Test Conditions: 527° C., 30 sec. contact time, Feed (TABLE III)

| Additive | None | 13A | 14A |
|---|---|---|---|
| Naphthenes | 9.6 | 10.8 | 11.0 |

I claim:

1. A composition for the passivation of metals and/or control of SOx emissions in FCC process comprising:
   (a) a coprecipitated ternary oxide composition having the formula: 30 to 50 MgO/5 to 30 $La_2O_3$/30 to 50 $Al_2O_3$ wherein the amounts of MgO, $La_2O_3$ and $Al_2O_3$ are expressed as weight percent, and the MgO is present as a microcrystalline component; and
   (b) the composition of (a) combined with approximately 1 to 15 weight percent of promoters for $SO_2$ oxidation and/or $H_2S$ release selected from the oxides of Ce, Pr, Ti, Nb, V, Fe and mixtures thereof.

2. The composition of claim 1 further characterized by the absence of a spinel phase, a surface area of 100 m²/g to 300 m²/g, and a $Na_2O$ content of below about 1% by weight.

3. The composition of claim 2 wherein the surface area is 130 to 200 m²/g.

4. The composition of claim 2 having a surface area of 100 to 150 m²/g after heating to 704° C. for 48 hours in the presence of 20% steam/80% air.

5. The composition of claim 1, combined with an FCC catalyst.

6. The composition of claim 1 wherein said $La_2O_3$ is derived from a La-enriched rare earth mixture.

7. The composition of claim 5 wherein the FCC catalyst includes an oxidation catalyst selected from the group consisting of Pt, Pd and mixtures thereof.

8. The composition of claim 5 wherein the FCC catalyst comprises a zeolite selected from the group consisting of Type Y, ultrastable Y, ZSM-5, Beta and mixtures thereof dispersed in an inorganic oxide matrix.

9. A method for passivating V and Ni and/or controlling SOx emissions from an FCC catalyst regeneration process which comprises catalytically cracking metals and/or sulfur containing hydrocarbon in the presence of the composition of claim 5 or 6.

10. The method of claim 9 wherein said feedstock contains V and/or Ni and the FCC catalyst includes: a coprecipitated ternary oxide composition having the formula: 30 to 50 MgO/5 to 30 $La_2O_3$/30 to 50 $Al_2O_3$ wherein the amounts of MgO, $La_2O_3$ and $Al_2O_3$ are expressed as weight percent, and the MgO is present as a microcrystalline component.

* * * * *